US007813319B2

(12) United States Patent
Dutta et al.

(10) Patent No.: US 7,813,319 B2
(45) Date of Patent: Oct. 12, 2010

(54) FRAMEWORK OF MEDIA-INDEPENDENT PRE-AUTHENTICATION

(75) Inventors: Ashutosh Dutta, Bridgewater, NJ (US); Yoshihiro Oba, Englewood Cliffs, NJ (US); Kenichi Taniuchi, Jersey City, NJ (US)

(73) Assignees: Toshiba America Research, Inc., Piscataway; Telcordia Technologies, Inc., Piscataway ( * ) Notice: Subject to any disclaimer, the term of this patent is extended or adjusted under 35 U.S.C. 154(b) by 619 days.

(21) Appl. No.: 11/307,362

(22) Filed: Feb. 2, 2006

(65) Prior Publication Data

US 2007/0204155 A1   Aug. 30, 2007

Related U.S. Application Data

(60) Provisional application No. 60/649,554, filed on Feb. 4, 2005.

(51) Int. Cl.
H04W 4/00 (2009.01)
(52) U.S. Cl. ..................................... 370/331
(58) Field of Classification Search ......... 370/331–334; 455/436–444
See application file for complete search history.

(56) References Cited

U.S. PATENT DOCUMENTS

| 6,987,743 | B2* | 1/2006 | Chen et al. ............ 370/328 |
| 7,046,647 | B2* | 5/2006 | Oba et al. ............. 370/331 |
| 7,206,301 | B2* | 4/2007 | Wu et al. .............. 370/338 |
| 7,246,272 | B2* | 7/2007 | Cabezas et al. ........ 714/53 |
| 7,277,434 | B2* | 10/2007 | Astarabadi et al. .... 370/389 |
| 2002/0118656 | A1* | 8/2002 | Agrawal et al. ....... 370/329 |
| 2002/0131386 | A1* | 9/2002 | Gwon .................. 370/338 |
| 2002/0141360 | A1* | 10/2002 | Baba et al. ........... 370/331 |
| 2003/0031151 | A1* | 2/2003 | Sharma et al. ........ 370/338 |
| 2004/0122976 | A1* | 6/2004 | Dutta et al. .......... 709/245 |
| 2005/0130659 | A1* | 6/2005 | Grech et al. .......... 455/436 |

FOREIGN PATENT DOCUMENTS

JP   2003-284117 A   10/2003
JP   2004-7576 A    1/2004

(Continued)

OTHER PUBLICATIONS

Hyun-Ho Choi; Song, O.; Dong-Ho Cho, "A seamless handoff scheme for UMTS-WLAN interworking," Global Telecommunications Conference, 2004. GLOBECOM '04. IEEE , vol. 3, No., pp. 1559-1564 vol. 3, Nov. 29-Dec. 3, 2004 URL: http://ieeexplore.ieee.org/iel5/9481/30079/01378244.pdf?isnumber=30079&prod=STD&arnumber=1378244&arnumber=1378244&arSt=+1559&ared=+156.*

(Continued)

*Primary Examiner*—Lester Kincaid
*Assistant Examiner*—Nathan Mitchell
(74) *Attorney, Agent, or Firm*—Watchstone P&D, PLLC

(57) ABSTRACT

This application describes, among other things, a framework of Media-independent Pre-Authentication (MPA), a new handover optimization mechanism that has a potential to address issues on existing mobility management protocols and mobility optimization mechanisms. MPA is a mobile-assisted, secure handover optimization scheme that works over any link-layer and with any mobility management protocol. This application also shows, among other things, an initial implementation of MPA in our testbed and some performance results to show how existing protocols could be leveraged to realize the functionalities of MPA.

30 Claims, 4 Drawing Sheets

FOREIGN PATENT DOCUMENTS

| JP | 2004-096169 A | 3/2004 |
|---|---|---|
| JP | 2004-201276 A | 7/2004 |
| JP | 2007-511147 A | 4/2007 |
| WO | 01/58182 A2 | 8/2001 |
| WO | 2005/004354 A1 | 1/2005 |

OTHER PUBLICATIONS

Mobile IP. Perkins, C.E.;Communications Magazine, IEEE vol. 35, Issue 5, May 1997.*

Choi et al., "A seamless handoff scheme for UMTS-WLAN interworking," Global Telecommunications Conference, 2004. GLOBECOM '04. IEEE , vol. 3, No., pp. 1559-1564 vol. 3, Nov. 29-Dec. 3, 2004. URL: http://ieeexplore.ieee.org/iel5/9481/30079/01378244.pdf?isnumber=30079&prod=STD&arnumber=1378244&arnumber=1378244&arSt=+1559&ared=+156.*

C. Perkins, IP Mobility Support for IPv4, Aug. 2002, p. 1-98, The Internet Society, USA.

D. Johnson, Mobility Support in IPv6, Jun. 2004, p. 1-163, The Internet Society, USA.

K. El Malki, Low Latency Handoffs in Mobile IPv4, Jun. 2004, p. 1-56, The Internet Society, USA.

R. Koodli, Fast Handovers for Mobile IPv6, Oct. 25, 2004, p. 1-53, The Internet Society, USA.

M. Liebsch, Candidate Access Router Discovery, Sep. 2004, p. 1-47, Internet Draft, USA.

J. Loughney, Context Transfer Protocol, Aug. 2004, p. 1-33, Internet Draft, USA.

B. Aboba, Extensible Authentication Protocol (EAP) Key Management Framework, Nov. 14, 2004, p. 1-73, Internet Draft, USA.

D. Forsberg, Protocol for Carrying Authentication for Network Access, Dec. 29, 2004, p. 1-76, Internet Draft, USA.

S. Park, Rapid Commit Option for DHCPv4, Jun. 25, 2004, p. 1-12, Internet Draft, USA.

G. Almes, A One-way Delay Metric for IPPM, Sep. 1999, p. 1-19, The Internet Society, USA.

G. Almes, A One-way Packet Loss Metric for IPPM, Sep. 1999, p. 1-15, The Internet Society, USA.

G. Almes, A Round-trip Delay Metric for IPPM, Sep. 1999, p. 1-19, The Internet Society, USA.

W. Simpson, IP in IP Tunneling, Oct. 1995, p. 1-6, The Internet Society, USA.

M. Patrick, DHCP Relay Agent Information Option, Jan. 2001, p. 1-11, The Internet Society, USA.

A. Yegin, Supporting Optimized Handover for IP Mobility—Requirements for Underlying Systems, Jun. 2002, p. 1-12, Internet Draft, USA.

R. Ramjee, Hawaii: A domain-based approach for supporting mobility in wireless networks, Oct. 3, 1999, pp. 283-292, Lucent Technol., USA.

S. Das, IDMP: An Intra-Domain Mobility Managem Protocol for Next Generation Wireless Network, p. 1-15, USA, Oct. 2002.

H. Yokota, Link Layer Assisted Mobile IP Fast Handoff Method Over Wireless LAN Networks, Sep. 2002, p. 131-139, USA.

A. Dutta, Secure Universal Mobility for Wireless Internet, p. 1-14, USA, Oct. 2004.

A. Dutta, Fast-Handoff Schemes for Application Layer Mobility Management, p. 1-7, USA, Sep. 2004.

Media—Independent Handover: Session Identifier, p. 1-19, United States Patent 20070183365, USA, Aug. 2007.

T. Kivinen, "Design of the MOBIKE protocol", Internet Draft, Jan. 2005, p. 1-37, The Internet Society, USA.

R. Moskowitz, "Host Identity Protocol", Internet-Draft, Oct. 2004, p. 1-103, The Internet Society, USA.

A. Campbell, "Design, Implementation, and Evaluation of Cellular IP", 2000 p. 1-19, USA.

R. Ramjee, "Hawaii: A Domain-based Approach for Supporting Mobility in Wide-area Wireless networks", 1999, p. 1-14, USA.

S. Shin., "Reducing MAC Layer Handoff Latency in IEEE 802.11 Wireless LANs", IEEE 802.11, p. 1-8, USA, Oct. 2004.

A. Dutta, "GPS-IP based fast-handoff for Mobiles", pp. 1-3, USA, Sep. 2003.

Japanese Office Action dated Feb. 23, 2010, issued in corresponding Japanese patent application No. 2007-536412 (partial translation).

W. Teerapabkajorndet et al., Comparison of Performance of Location-Aware and Traditional Handoff-Decision Algorithm in CDPD Networks, IEEE VTC conference 2001, USA, IEEE, 2001, vol. 1, pp. 212-216.

W. Teerapabkajorndel et al., Throughput consideration for location-aware handoff in mobile data networks, IEEE International Symposium in Personal, Indoor and Mobile Radio Communications, USA, IEEE, Sep. 15, 2002, vol. 5, pp. 2223-2227.

S. Kyriazakos et al., Optimization of the handover algorithm based on position of the mobile terminals, IEEE Symposium on Communications and Vehicular Technology, USA, IEEE, Oct. 19, 2000, pp. 155-159.

Japanese office Action dated Aug. 25, 2009, issued in corresponding Japanese patent application No. 2006-552387 (partial translation).

Dutta, et al. "A Framework of Media-Independent Pre-Authentication (MPA) draft-ohba-mobopts-mpa-framework-00.tx;" IETF Standard Working Draft; Feb. 13, 2005.

Gwon, Y. et al. Fast Handoffs in Wireless LAN Networks Using Mobile Initiated Tunnling Handoff Wireless Comm. & Networking, vol. 2; Mar. 16, 2003; pp. 1248-1253.

Koodli, R. "Fast Handoffs for Mobile IPv6," Internet Draft; Oct. 25, 2004; pp. 1-46.

El Malki, K. et al., "Low Latency Handoffs in Mobile IPv4; draft-ietf-mobileip-lowlatency-handoffs-v4-09.txt;" IETF Standard Working Draft; vol. mobileip, No. 9; Jun. 2004.

Festag A., Optimization of handover performance by link layer triggers in IP based Networks . . . Technical University of Berlin Aug. 2002; Retrieved from the Internet.

Kempf, J., et al. Requirements for Layer 2 Protocols to Support Optimized Handover for IP Mobility; draft-manyfolks-12-mobilereq-00.txt; IETF Standard Working Draft; Jul. 2001.

* cited by examiner

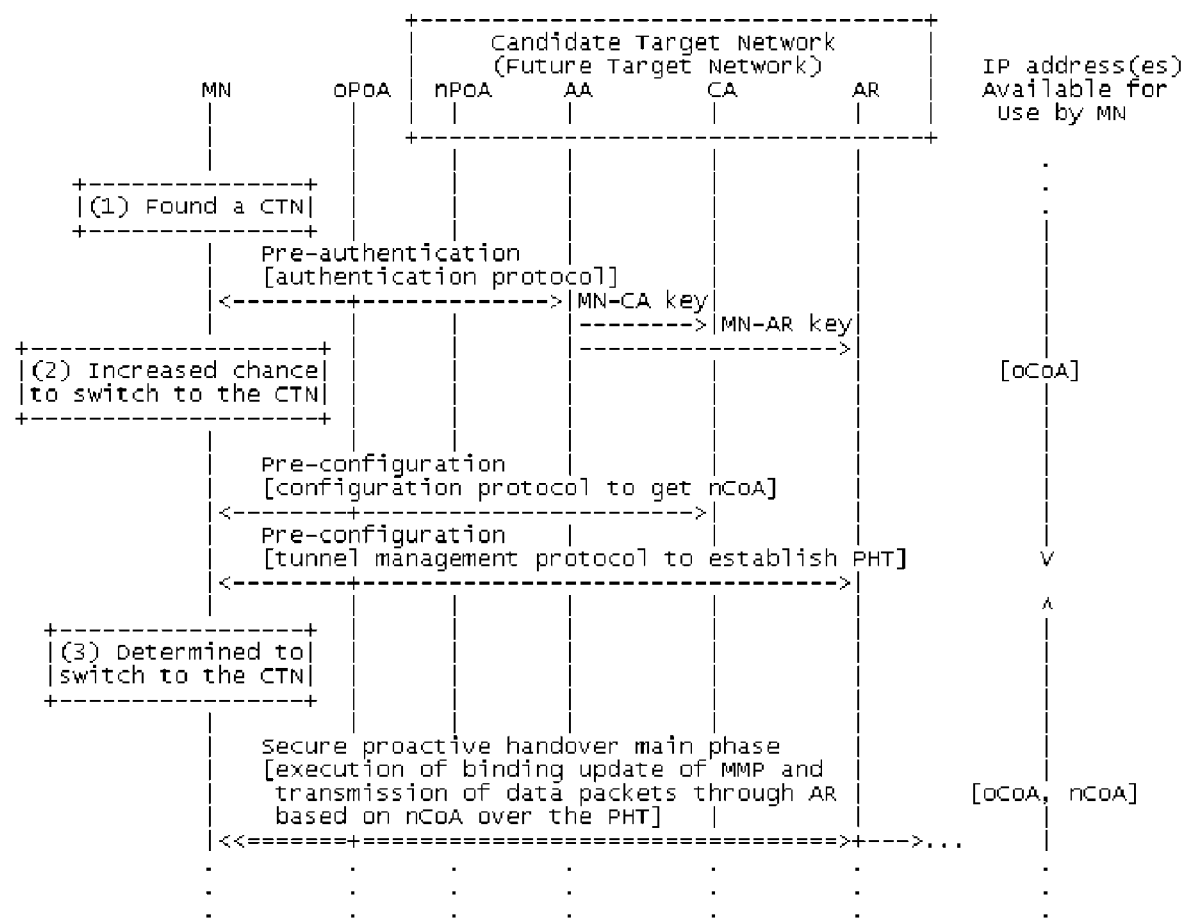
Figure 1: Basic Communication Flow (1/2)

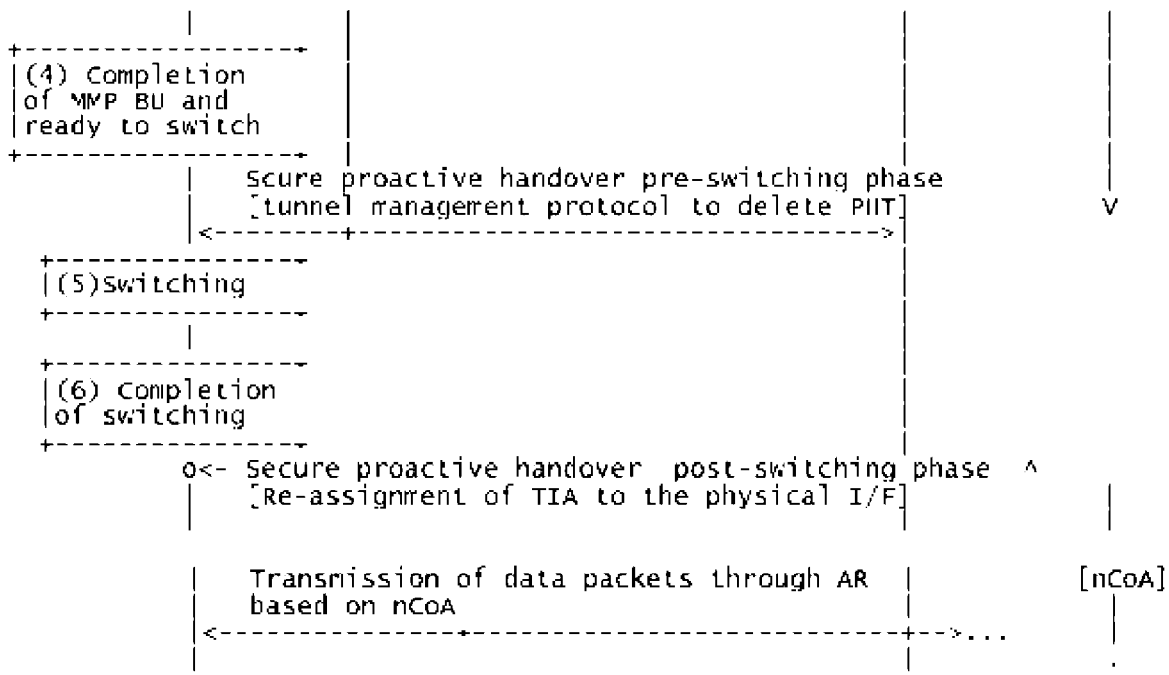
Figure 2: Basic Communication Flow (2/2)
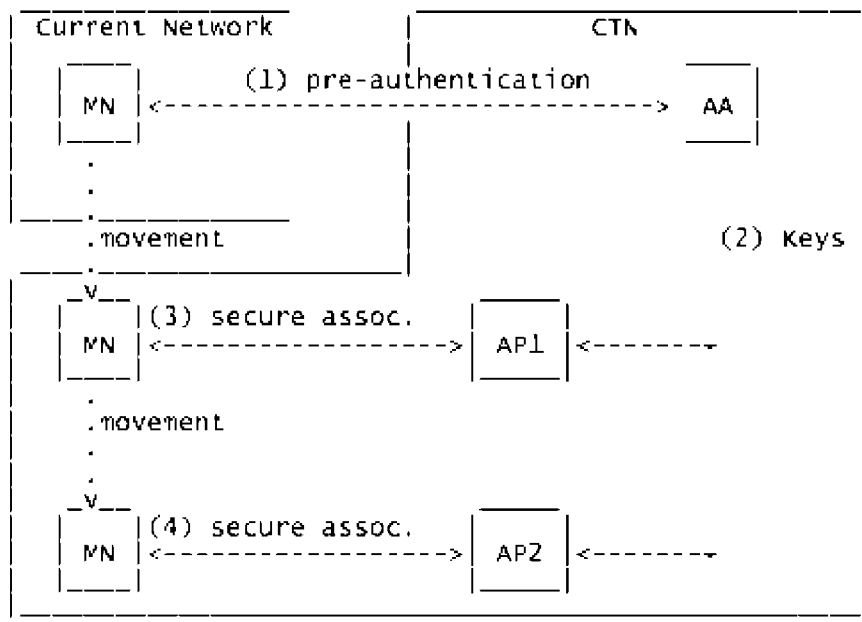
Figure 3: Bootstrapping Link-layer Security

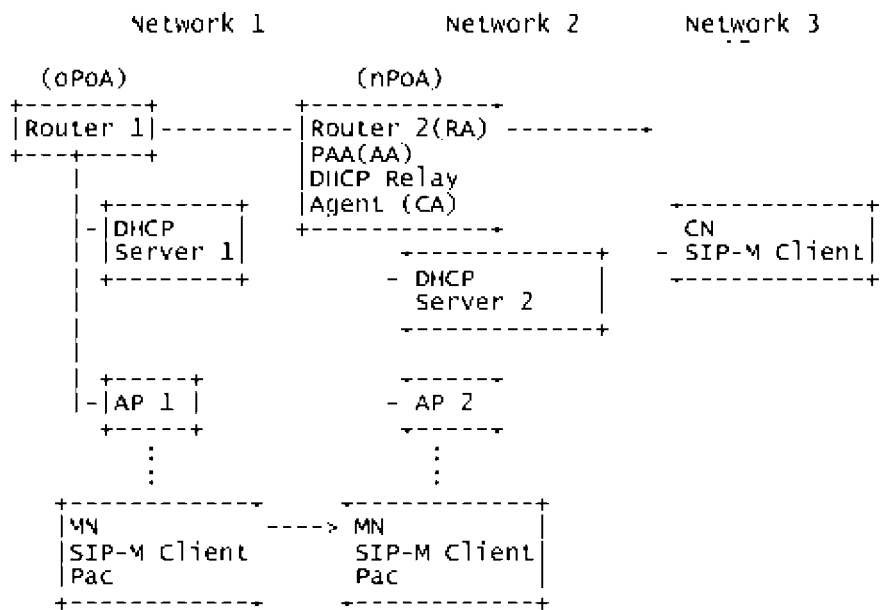
Figure 4: Network Structure
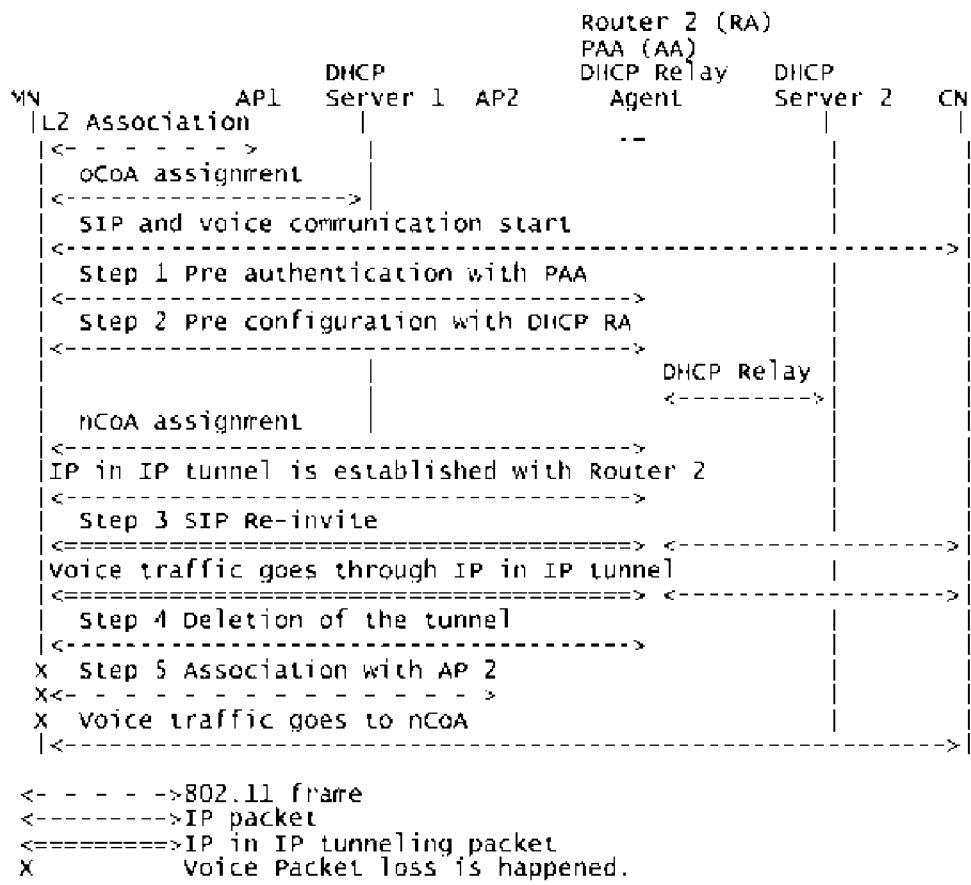
Figure 5: MPA Communication Flow in the implementation environment

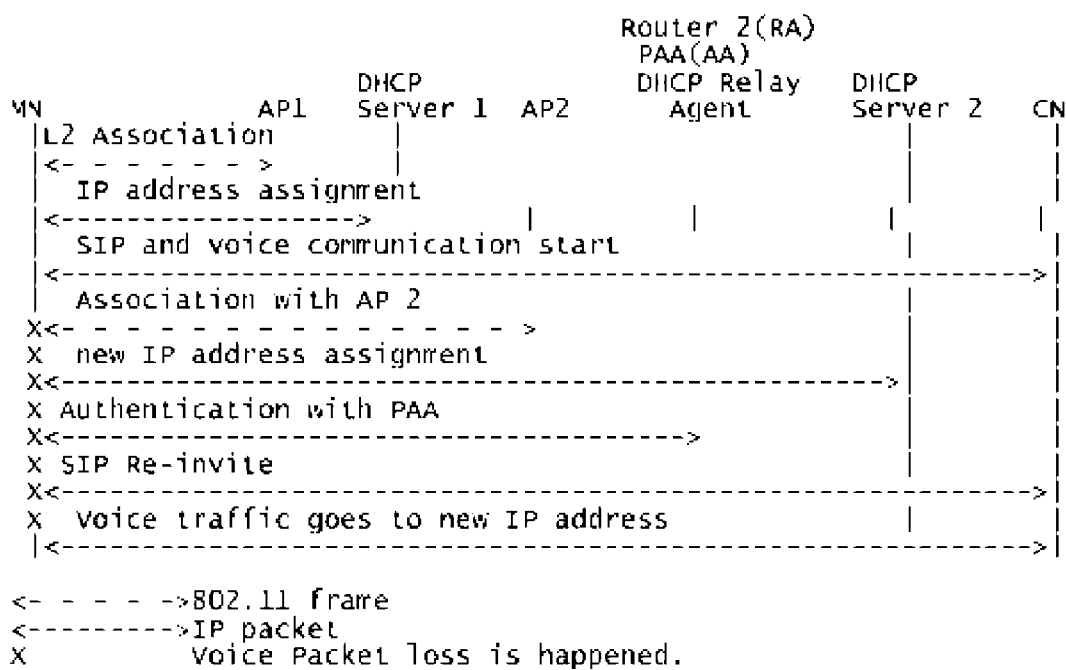
Figure 6: Communication Flow for Non-MPA in the implementation environment

FRAMEWORK OF MEDIA-INDEPENDENT PRE-AUTHENTICATION

The present application claims priority under 35 U.S.C. 119 to U.S. Provisional Patent Application No. 60/649,554 filed Feb. 4, 2005, entitled A Framework Of Media-independent Pre-Authentication, the entire disclosure of which is incorporated herein by reference. In addition, the present application incorporates by reference the entire disclosures of each of the following U.S. Provisional Patent Applications: 1) Ser. No. 60/625,106, filed on Nov. 5, 2004, entitled Network Discovery Mechanism For Secure Fast Handoff; 2) Ser. No. 60/593,377, filed on Jan. 9, 2005, entitled Network Discovery Mechanisms; 3) Ser. No. 60/670,655, filed on Apr. 13, 2005, entitled Network Discovery Mechanisms; and 4) Ser. No. 60/697,589, filed on Jul. 11, 2005, entitled RDF Schema Update for 802.1 Baseline Document. In addition, the entire disclosure of the following co-pending Utility U.S. patent application is incorporated herein by reference: U.S. patent application Ser. No. 10/761,243 entitled Mobility Architecture Using Pre-Authentication, Pre-Configuration and/or Virtual Soft-Handoff, filed on Jan. 22, 2004.

BACKGROUND

1. Field of the Invention

The present application relates to, inter alia, methods for network discovery mechanisms, including, e.g., methods for network discovery mechanisms for secure fast handoff and the like.

2. Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

The preferred embodiments improve upon technologies described, e.g., in the following references, each of which references listed below is incorporated herein by reference in its entirety:

1. Perkins, C., "IP Mobility Support for IPv4", RFC 3344, August 2002. Referred to herein as [RFC3344].
2. Johnson, D., Perkins, C. and J. Arkko, "Mobility Support in IPv6", RFC 3775, June 2004. Referred to herein as [RFC3775].
3. Malki, K., "Low latency Handoffs in Mobile IPv4", draft-ietf-mobileip-lowlatency-handoffs-v4-09 (work in progress), June 2004. Referred to herein as [I-D.ietf-mobileip-lowlatency-handoffs-v4].
4. Koodli, R., "Fast Handovers for Mobile IPv6", draft-ietf-mipshop-fast-mipv6-03 (work in progress), October 2004. Referred to herein as [I-D.ietf-mipshop-fast-mipv6].
5. Liebsch, M., "Candidate Access Router Discovery", draft-ietf-seamoby-card-protocol-08 (work in progress), September 2004. Referred to herein as [I-D.ietf-seamoby-card-protocol].
6. Loughney, J., "Context Transfer Protocol", draft-ietf-seamoby-ctp-11 (work in progress), August 2004. Referred to herein as [I-D.ietf-seamoby-ctp].
7. Aboba, B., "Extensible Authentication Protocol (EAP) Key Management Framework", draft-ietf-eap-keying-04 (work in progress), November 2004. Referred to herein as [I-D.ietf-eap-keying].
8. Forsberg, D., Ohba, Y., Patil, B., Tschofenig, H. and A. Yegin, "Protocol for Carrying Authentication for Network Access (PANA)", draft-ietf-pana-pana-07 (work in progress), December 2004. Referred to herein as [I-D.ietf-pana-pana].
9. Kim, P., Volz, B. and S. Park, "Rapid Commit Option for DHCPv4", draft-ietf-dhc-rapid-commit-opt-05 (work in progress), June 2004. Referred to herein as [1-D.ietf-dhc-rapid-commit-opt].
10. ITU-T, "General Characteristics of International Telephone Connections and International Telephone Cirsuits: One-Way Transmission Time." Referred to hearin as [RG98].
11. ITU-T, "The E-Model, a computational model for use in transmission planning." Referred to herein as [ITU98].

12. ETSI, "Telecommunications and Internet Protocol Harmonization Over Networks (TIPHON) Release 3: End-to-end Quality of Service in TIPHON systems; Part 1: General Aspects of Quality of Service." Referred to herein as [ETSI].
13. Kivinen, T. and H. Tschofenig, "Design of the MOBIKE protocol," draft-ietf-mobike-design-01 (work in progress), January 2005. Referred to herein as [I-D.ietf-mobike-design].
14. Moskowitz, R., "Host Identity Protocol", draft-ietf-hip-base-01 (work in progress), October 2004. Referred to herein as [I-D.ietf-hip-base].
15. Almes, G., Kalidindi, S. and M. Zekauskas, "A One-way Delay Metric for IPPM", RFC 2679, September 1999. Referred to herein as [RFC2679].
16. Almes, G., Kalidindi, S. and M. Zekauskas, "A One-way Packet Loss Metric for IPPM", RFC 2680, September 1999. Referred to herein as [RFC2680].
17. Almes, G., Kalidindi, S. and M. Zekauskas, "A Round-trip Delay Metric for IPPM", RFC 2681, September 1999. Referred to herein as [RFC2681].
18. Simpson, W., "IP in IP Tunneling", RFC 1853, October 1995. Referred to herein as [RFC1853].
19. Patrick, M., "DHCP Relay Agent Information Option", RFC 3046, January 2001. Referred to herein as [RFC3046].
20. Schulzrine, H., "Application Layer Mobility Using SIP." Referred to herein as [SIPMM].
21. Yegin, A., "Supporting Optimized Handover for IP Mobility-Requirements for Underlying Systems", draft-many-folks-l2-mobilereq-02 (work in progress), July 2002. Referred to herein as [I-D.manyfolks-l2-mobilereq].
22. Cambell, A., Gomez, J., Kim, S., Valko, A. and C. Wan, "Design, Implementation, and Evaluation of Cellular IP." Referred to herein as [CELLIP].
23. Ramjee, R., Porta, T., Thuel, S., Varadhan, K. and S. Wang, "HAWAII: A Domain-based Approach for Supporting Mobility in Wide-area Wireless networks." Referred to herein as [HAWAII].
24. Das, S., Dutta, A., Misra, A. and S. Das, "IDMP: An Intra-Domain Mobility Management Protocol for Next Generation Wireless Networks." Referred to herein as [IDMP].
25. Calhoun, P., Montenegro, G., Perkins, C. and E. Gustafsson, "Mobile IPv4 Regional Registration", draft-ietf-mobileip-reg-tunnel-09 (work in progress), July 2004. Referred to herein as [I-D.ietf-mobileip-reg-tunnel].
26. Yokota, H., Idoue, A. and T. Hasegawa, "Link Layer Assisted Mobile IP Fast Handoff Method over Wireless LAN Networks." Referred to herein as [YOKOTA].
27. Shin, S., "Reducing MAC Layer Handoff Latency in IEEE 802.11 Wireless LANs." Referred to herein as [MACD].
28. Dutta, A., "Secured Universal Mobility." Referred to herein as [SUM].
29. Dutta, A., "Fast handoff Schemes for Application Layer Mobility Management." Referred to herein as [SIPFAST].
30. Gwon, Y., Fu, G. and R. Jain, "Fast Handoffs in Wireless LAN Networks using Mobile initiated Tunneling Handoff Protocol for IPv4 (MITHv4)", January 2005. Referred to herein as [MITH].
31. Anjum, F., Das, S., Dutta, A., Fajardo, V., Madhani, S., Ohba, Y., Taniuchi, K., Yaqub, R. and T. Zhang, "A proposal for MIH function and Information Service", January 2005. Referred to herein as [NETDISC].
32. Dutta, A., "GPS—IP based fast-handoff for Mobiles." Referred to herein as [GPSIP].
33. [MAGUIRE] Vatn, "The effect of using co-located care-of-address on macro handover latency."

SUMMARY OF THE INVENTION

The present invention improves upon the above and/or other background technologies and/or problems therein.

According to some of the preferred embodiments, a method of providing terminal mobility between networks agnostic to link-layer technologies includes: employing a mobility management protocol which operates at a network layer or higher that maintains a mobility binding between a locator and an identifier of a mobile node. Preferably, the method further includes: employing a mobility optimization mechanism that works in the visited network of the mobile node to inhibit loss of outstanding packets transmitted. Preferably, the method further includes the mobility optimization mechanism allowing neighboring access routers to communicate so as to carry information on mobile nodes. In some preferred embodiments, the method further includes the mobility optimization mechanism being a unified mechanism that works with any mobility management protocol. In some preferred embodiments, the method further includes supporting handovers across administrative domains without assuming a pre-established security association between administrative domains. In some embodiments, the method further includes the mobility management mechanism working across administrative domains in a secure manner based on a trust relationship between a mobile node and each administrative domain. In some embodiments, the method further includes the mobility management mechanism supporting both multi-interface terminals and single-interface terminals.

According to some preferred embodiments, a mobile-assisted, secure handover optimization method, for mobile node handoff from a current network to a new network, includes: a) providing a mobility optimization scheme configured to work over any link-layer and with any mobility management protocol; b) performing pre-authentication at higher layers, and performing early acquisition of an IP address from a new network where the mobile node may move and a proactive handover to the new network while the mobile node is still attached to the current network. In some embodiments, the method further includes having a mobile node securely obtain an IP address and other configuration parameters from a candidate target network and also send and receive IP packages using the obtained IP address and obtained configuration parameters before it attaches to the candidate target network when the candidate target network becomes a target network. In some embodiments, the method further includes having the mobile node complete a binding update of a mobility management protocol and use a new care of address before performing a handover at a link-layer. In some embodiments, the method further includes having the mobile node which is connected to a current network but is not yet attached to a candidate target network (i) establish a security association with the candidate target network to secure the subsequent protocol executions, and then (ii) securely execute a configuration protocol to obtain an IP address and other configuration parameters from the candidate target network as well as a tunnel management protocol to establish a bidirectional tunnel between the mobile node and an access router of the candidate target network, and then (iii) send and receive IP packets, including signaling messages for binding update of a mobility management protocol and data packets transmitted after completion of binding update, over the tunnel using the obtained IP address as a tunnel inner address. In some other embodiments, the method includes then deleting or disabling the tunnel shortly before attaching to the candidate target network when it becomes the target network and then re-assigning the inner address of the deleted or disabled tunnel to its physical interface shortly after the mobile node is attached to the target network through the interface, while in some embodiments, the method includes deleting or disabling the tunnel shortly after attaching to the target network.

According to some other embodiments, a method for performing media-independent pre-authentication (MPA) includes: a) providing a mobile node that is attached to an old point of attachment and assigned an old care-of address within a current network; b) performing a pre-authentication phase in which the mobile node finds a candidate target network through a discovery process and obtains an IP address and an authentication agent, a configuration agent and an access router in the candidate target network, with the mobile node performing pre-authentication with the authentication agent; c) performing a pre-configuration phase in which the mobile node realizes that its point of attachment is likely to change from the old point of attachment to a new point of attachment, and it then performs pre-configuration, with the configuration agent using a configuration protocol to obtain an IP address or new care-of address, and other configuration parameters from the candidate target network, and with the access router using the tunnel management protocol to establish a proactive handover tunnel; d) performing a secure proactive handover main phase in which the mobile node determines to switch to the new point of attachment and before it switches, it starts a secure proactive handover by executing a binding update of a mobility management protocol and transmits subsequent data traffic over the tunnel; e) performing a secure proactive handover pre-switching phase in which the mobile node completes the binding update and becomes ready to switch to the new point of attachment; f) performing a switching phase in which a link-layer handoff occurs; and g) performing a secure proactive handover post-switching phase in which the mobile node executes a switching procedure. In some embodiments, the method further includes performing duplicate address detection to avoid handover delay. In some other embodiments, the method further includes performing proactive address resolution. In some other embodiments, the method further includes once the proactive handover tunnel is established between the mobile node and the access router in the candidate target network, the access router performs proxy address resolution on behalf of the mobile node so that it can capture packets destined to the mobile node's new address. In some other embodiments, the method further includes bicasting or buffering transient packets at the access router to minimize or eliminate packet loss. In some other embodiments, the method further includes using an MPA-SA established between the mobile node and the authentication agent in a candidate target network during the pre-authentication phase bootstrapping link-layer security in the candidate target network while the mobile node is in the current network. In some embodiments, before a mobile node switches to a new point of attachment, it starts a secure proactive handover by executing a binding update of a mobility management protocol and transmits subsequent data traffic over the tunnel.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 1 is flow diagram depicting a basic communication flow according to some illustrative embodiments, which flow diagram is continued in FIG. 2;

FIG. 2 is a continuation of the flow diagram shown in FIG. 1;

FIG. 3 is a diagram depicting the bootstrapping of link-layer security according to some illustrative embodiments;

FIG. 4 is an architectural diagram depicting illustrative network structure according to some illustrative embodiments;

FIG. 5 is a flow diagram depicting a media-independent pre-authentication (MPA) communication flow diagram according to an illustrative implementation environment; and FIG. 6 is a flow diagram depicting a non-MPA communication flow diagram according to an illustrative implementation environment.

DISCUSSION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

1. Introduction

As wireless technologies including cellular and wireless LAN are popularly used, supporting terminal handovers across different types of access networks, such as from a wireless LAN to CDMA or to GPRS is considered as a clear challenge. On the other hand, supporting terminal handovers between access networks of the same type is still challenging, especially when the handovers are across IP subnets or administrative domains. To address those challenges, it is important to provide terminal mobility that is agnostic to link-layer technologies in an optimized and secure fashion without incurring unreasonable complexity. In this document we discuss terminal mobility that provide seamless handovers with low-latency and low-loss. Seamless handovers are characterized in terms of performance requirements as described in Section 1.1.

The basic part of terminal mobility is accomplished by a mobility management protocol that maintains a binding between a locator and an identifier of a mobile terminal, where the binding is referred to as the mobility binding. The locator of the mobile node may dynamically change when there is a movement of the mobile terminal. The movement that causes a change of the locator may occur not only physically but also logically. A mobility management protocol may be defined at any layer. In the rest of this document, the term "mobility management protocol" refers to a mobility management protocol which operates at network layer or higher.

There are several mobility management protocols at different layers. Mobile IP [RFC3344] and Mobile IPv6 [RFC3775] are mobility management protocols that operate at network-layer. There are several ongoing activities in the IETF to define mobility management protocols at layers higher than network layer. For example, MOBIKE (IKEv2 Mobility and Multihoming) [I-D.ietf-mobike-design] is an extension to IKEv2 that provides the ability to deal with a change of an IP address of an IKEv2 end-point. HIP (the Host Identity Protocol) [I-D.ietf-hip-base] defines a new protocol layer between network layer and transport layer to provide terminal mobility in a way that is transparent to both network layer and transport layer. Also, SIP-Mobility is an extension to SIP to maintain the mobility binding of a SIP user agent [SIPMM].

While mobility management protocols maintain mobility bindings, using them solely in their current form is not sufficient to provide seamless handovers. An additional optimization mechanism that works in the visited network of the mobile terminal to prevent loss of outstanding packets transmitted while updating the mobility binding is needed to achieve seamless handovers. Such a mechanism is referred to as a mobility optimization mechanism. For example, mobility optimization mechanisms [I-D.ietf-mobileip-lowlatency-handoffs-v4] and [I-D.ietf-mipshop-fast-mipv6] are defined for Mobile IPv4 and Mobile IPv6, respectively, by allowing neighboring access routers to communicate to carry information on mobile terminals. There are protocols that are considered as "helpers" of mobility optimization mechanisms. The CARD (Candidate Access Router Discovery Mechanism) protocol [I-D.ietf-seamoby-card-protocol] is designed to discover neighboring access routers. The CTP (Context Transfer Protocol) [I-D.ietf-seamoby-ctp] is designed to carry state that is associated with the services provided for the mobile terminal, or context, among access routers.

There are several issues in existing mobility optimization mechanisms. First, existing mobility optimization mechanisms are tightly coupled with specific mobility management protocols. For example, it is not possible to use mobility optimization mechanisms designed for Mobile IPv4 or Mobile IPv6 for MOBIKE. What is strongly desired is a single, unified mobility optimization mechanism that works with any mobility management protocol. Second, there is no existing mobility optimization mechanism that easily supports handovers across administrative domains without assuming a pre-established security association between administrative domains. A mobility optimization mechanism should work across administrative domains in a secure manner only based on a trust relationship between a mobile node and each administrative domain. Third, a mobility optimization mechanism needs to support not only multi-interface terminals where multiple simultaneous connectivity through multiple interfaces can be expected, but also single-interface terminals.

This document describes a framework of Media-independent Pre-Authentication (MPA), a new handover optimization mechanism that has a potential to address all those issues. MPA is a mobile-assisted, secure handover optimization scheme that works over any link-layer and with any mobility management protocol including Mobile IPv4, Mobile IPv6, MOBIKE, HIP, SIP mobility, etc. In MPA, the notion of IEEE 802.11i pre-authentication is extended to work at higher layer, with additional mechanisms to perform early acquisition of IP address from a network where the mobile terminal may move as well as proactive handover to the network while the mobile terminal is still attached to the current network. The present application shows, among other things, an initial illustrative implementation of MPA in our testbed and some performance results to show how existing protocols could be leveraged to realize the functionalities of MPA.

In some of the preferred embodiments described herein, systems and methods are described to proactively establish higher layer and lower layer contexts of different media. Here, media includes, e.g., the available networks accessible to mobile devices (e.g., wired, wireless licensed, wireless unlicensed, etc.). See, e.g., media discussed in I.E.E.E. 802, including I.E.E.E. 802.21. Media may include, e.g., cellular, wireless LAN (e.g., I.E.E.E. 802.11), I.E.E.E. 802.16, I.E.E.E. 802.20, Bluetooth, etc. Some illustrative examples include: 1) a mobile device switching from a cellular network to a wireless or WIFI network, such as, e.g., a cell phone with cellular interface and wireless interface trying to get WIFI access by obtaining information (e.g., keys, etc.) initially over the cellular network, rather than simultaneously establishing a wireless interface; 2) where a mobile device currently has wireless or WIFI connectivity, where the wireless LAN may potentially shut down quickly or the like, in which case, by way of example, the mobile device can proactively do pre-authentication via cellular network (i.e., so as to enable a quick switch if needed). In some illustrative cases, a mobile node with a single IEEE 802.xx interface may roam among multiple subnets and multiple administrative domains. While keeping multiple interfaces always-on is an option, a mobile node may want to deactivate unused interfaces in some instances (such as, e.g., to save power, etc.). In addition, MPA can provide, among other things, secure and seamless mobility optimization that works for inter-subnet handoff, inter-domain handoff, inter-technology handoff, etc., as well as the use of multiple interfaces.

1.1 Performance Requirements

In order to provide desirable quality of service for interactive VoIP and streaming traffic, one needs to limit the value of end-to-end delay, jitter and packet loss to a certain threshold level. ITU-T and ITU-E standards define the acceptable values for these parameters. For example for one-way delay, ITU-T G.114 recommends 150 ms as the upper limit for most of the applications, and 400 ms as generally unacceptable delay. One way delay tolerance for video conferencing is in the range of 200 to 300 ms. Also if an out-of-order packet is received after a certain threshold it is considered lost. References [RFC2679], [RFC2680] and 2681 [RFC2681] describe some of the measurement techniques for delay and jitter. Also if an out-of-order packet is received after a certain threshold it is considered lost.

An end-to-end delay includes several components, such as network delay, OS delay, CODEC delay and application delay. Network delay includes transmission delay, propagation delay, queueing delay in the intermediate routers. Operating System related delay includes scheduling behavior of the operating system in the sender and receiver. CODEC delay is generally caused due to packetization and depacketization at the sender and receiver end. Application delay is mainly attributed to playout delay that helps compensate the delay variation within a network. End-to-end delay and jitter values can be adjusted using proper value of the playout buffer at the receiver end. In case of interactive VoIP traffic end-to-end delay affects the jitter value and is an important thing to consider. During a mobile's frequent handover, transient traffic cannot reach the mobile and this contributes to the jitter as well. If the end system has a playout buffer, then this jitter is subsumed by the playout buffer delay, but otherwise this adds to the delay for interactive traffic. Packet loss is typically caused by congestion, routing instability, link failure, lossy links such as wireless links. During a mobile's handover a mobile is subjected to packet loss because of its change in attachment to the network. Thus for both streaming traffic and VoIP interactive traffic packet loss will contribute to the service quality of the real-time application. Number of packets lost is proportional to the delay during handover and rate of traffic the mobile is receiving. Lost packets contribute to congestion in case of TCP traffic because of re-transmission, but it does not add to any congestion in case of streaming traffic that is RTP/UDP based. Thus, it is essential to reduce the packet loss and effect of handover delay in any mobility management scheme. In Section 2, we describe some of the fast-handover scheme that have tried to reduce the handover.

According to ETSI TR 101 [ETSI] a normal voice conversation can tolerate up to 2% packet loss. If a mobile is subjected to frequent handoff during a conversation, each handoff will contribute to packet loss for the period of handoff. Thus maximum loss during a conversation needs to be reduced to a level that is acceptable. There is no clear threshold value for packet loss for streaming application, but it needs to be reduced as much as possible to provide better quality of service to a specific application.

2. Existing Work Fast-Handover

While basic mobility management protocols such as Mobile IP [RFC3344], Mobile IPv6 [RFC3775], SIP-Mobility [SIPMM] offer solutions to provide continuity to TCP and RTP traffic, these are not optimized to reduce the handover latency during mobile's frequent movement between subnets and domains. In general these mobility management protocols suffer from handover delays incurred at several layers such as layer 2, layer 3 and application layer for updating the mobile's mobility binding. Reference [Yegin] discusses the requirements to support optimized handover between two access points on the same subnet, between two access routers on different subnets, and for context transfer between access routers. These requirements apply to any type of mobility management protocols described above.

There have been several optimization techniques that apply to current mobility management schemes that try to reduce handover delay and packet loss during a mobile's movement between cells, subnet and domain. There are few micro-mobility management schemes [CELLIP], [HAWAII], and intra-domain mobility management schemes such as [IDMP], [I-D.ietf-mobileip-reg-tunnel] that provide fast-handover by limiting the signaling updates within a domain. Fast Mobile IP protocols for IPv4 and IPv6 networks [I-D.ietf-mobileip-lowlatency-handoffs-v4], [I-D.ietf-mipshop-fast-mipv6] provide fast-handover techniques that utilize mobility information made available by the link layer triggers. Yokota et al. [YOKOTA] proposes joint use of access point and dedicated MAC bridge to provide fast-handover without altering MIPv4 specification. [MACD] scheme reduces the delay due to MAC layer handoff by providing a cache-based algorithm.

Some of the mobility management schemes use dual interfaces thus providing make-before-break scenario [SUM]. In a make-before-break situation communication usually continues with one interface, when the secondary interface is in the process of getting connected. The IEEE 802.21 working group is discussing these scenarios in details. Providing fast-handover using a single interface needs more careful design techniques than for a client with multiple interfaces. [SIP-FAST] provides an optimized handover scheme for SIP-based mobility management, where the transient traffic is forwarded from the old subnet to the new one by using an application layer forwarding scheme. [MITH] provides a fast handover scheme for a single interface case that uses mobile initiated tunneling between the old foreign agent and new foreign agent. [MITH] defines two types of handover schemes such as Pre-MIT and Post-MIT. Our MPA scheme is generally comparable to MITH's predictive scheme where the mobile communicates with the foreign agent before actually moving to the new network. However, the proposed MPA scheme described in this document is not limited to MIP type mobility protocol only and in addition this scheme takes care of movement between domains and performs pre-authentication in addition to proactive handover. Thus the proposed scheme reduces the overall delay to close to link-layer handover delay.

3. Terminology

Mobility Binding:

A binding between a locator and an identifier of a mobile terminal. Mobility Management Protocol (MMP): A protocol that operates at network layer or higher to maintain a binding between a locator and an identifier of a mobile terminal.

Binding Update:

A procedure to update a mobility binding.

Media-Independent Pre-Authentication Mobile Node (MN):

A mobile terminal of media-independent pre-authentication (MPA) which is a mobile-assisted, secure handover optimization scheme that works over any link-layer and with any mobility management protocol. An MPA mobile node is an IP node. In this document, the term "mobile node" or "MN" without a modifier refers to "MPA mobile node." An MPA mobile node usually has a functionality of a mobile node of a mobility management protocol as well.

Candidate Target Network (CTN):

A network to which the mobile may move in the near future.

Target Network (TN):

The network to which the mobile has decided to move. The target network is selected from one or more candidate target network.

Proactive Handover Tunnel (PHT):

A bidirectional IP tunnel that is established between the MPA mobile node and an access router of the candidate target network. In this document, the term "tunnel" without a modifier refers to "proactive handover tunnel."

Point of Attachment (PoA):

A link-layer device (e.g., a switch, an access point or a base station, etc.) that functions as a link-layer attachment point for the MPA mobile node to a network.

Care-of Address (CoA):

An IP address used by a mobility management protocol as a locator of the MPA mobile node 4. MPA Framework 4.1 Overview Media-independent Pre-Authentication (MPA) is a mobile-assisted, secure handover optimization scheme that works over any link-layer and with any mobility management protocol. With MPA, a mobile node is not only able to securely obtain an IP address and other configuration parameters from a candidate target network, but also able to send and receive IP packets using the obtained IP address and other configuration parameters, before it attaches to the candidate target network when the candidate target network becomes the target network. This makes it possible for the mobile node to complete the binding update of any mobility management protocol and use the new care-of address before performing a handover at link-layer.

This functionality is provided by allowing a mobile node, which has a connectivity to the current network but is not yet attached to a candidate target network, to (i) establish a security association with the candidate target network to secure the subsequent protocol executions, then (ii) securely execute a configuration protocol to obtain an IP address and other configuration parameters from the candidate target network as well as a tunnel management protocol to establish a bidirectional tunnel between the mobile node and an access router of the candidate target network, then (iii) send and receive IP packets, including signaling messages for binding update of a mobility management protocol and data packets transmitted after completion of binding update, over the tunnel using the obtained IP address as the tunnel inner address, and finally (iv) deleting or disabling the tunnel immediately before attaching to the candidate target network when it becomes the target network and then re-assigning the inner address of the deleted or disabled tunnel to its physical interface immediately after the mobile node is attached to the target network through the interface. Instead of deleting or disabling the tunnel before attaching to the target network, the tunnel may be deleted or disabled immediately after attached to the target network.

Especially, the third procedure makes it possible for the mobile to complete higher-layer handover before starting link-layer handover. This means that the mobile is able to send and receive data packets transmitted after completion of binding update over the tunnel, while it is still able to send and receive data packets transmitted before completion of binding update outside the tunnel.

In the above four basic procedures of MPA, the first procedure is referred to as "pre-authentication", the second procedure is referred to as "pre-configuration", the combination of the third and fourth procedures are referred to as "secure proactive handover." The security association established through pre-authentication is referred to as an "MPA-SA." The tunnel established through pre-configuration is referred to as a "proactive handover tunnel."

4.2 Functional Elements

In the MPA framework, the following functional elements are expected to reside in each candidate target network to communicate with a mobile node: Authentication Agent (AA), Configuration Agent (CA) and Access Router (AR). Some or all of those elements can be placed in a single network device or in separate network devices.

An authentication agent is responsible for pre-authentication. An authentication protocol is executed between the mobile node and the authentication agent to establish an MPA-SA. The authentication protocol MUST be able to derive a key between the mobile node and the authentication agent, SHOULD be able to provide mutual authentication. The authentication protocol SHOULD be able to interact with a AAA protocol such as RADIUS and Diameter to carry authentication credentials to an appropriate authentication server in the AAA infrastructure. The derived key is used for further deriving keys used for protecting message exchanges used for pre-configuration and secure proactive handover. Other keys that are used for bootstrapping link-layer and/or network-layer ciphers MAY also be derived from the MPA-SA.

A configuration agent is responsible for one part of pre-configuration, namely securely executing a configuration protocol to securely deliver an IP address and other configuration parameters to the mobile node. The signaling messages of the configuration protocol MUST be protected using a key derived from the key corresponding to the MPA-SA.

An access router is a router that is responsible for the other part of pre-configuration, i.e., securely executing a tunnel management protocol to establish a proactive handover tunnel to the mobile node, and secure proactive handover using the proactive handover tunnel. The signaling messages of the configuration protocol MUST be protected using a key derived from the key corresponding to the MPA-SA. IP packets transmitted over the proactive handover tunnel SHOULD be protected using a key derived from the key corresponding to the MPA-SA.

4.3 Basic Communication Flow

Assume that the mobile node is already connected to a point of attachment, say oPoA (old point of attachment), and assigned a care-of address, say oCoA (old care-of address). The communication flow of MPA is described as follows. Throughout the communication flow, data packet loss should not occur except for the period during the switching procedure in Step 5, and it is the responsibility of link-layer handover to minimize packet loss during this period.

Step 1 (pre-authentication phase): The mobile node finds a candidate target network through some discovery process and obtains the IP addresses, an authentication agent, a configuration agent and an access router in the candidate target network by some means. The mobile node performs pre-authentication with the authentication agent. If the pre-authentication is successful, an MPA-SA is created between the mobile node and the authentication agent. Two keys are derived from the MPA-SA, namely an MN-CA key and an MN-AR key, which are used to protect subsequent signaling messages of a configuration protocol and a tunnel management protocol, respectively. The MN-CA key and the MN-AR key are then securely delivered to the configuration agent and the access router, respectively.

Step 2 (pre-configuration phase): The mobile node realizes that its point of attachment is likely to change from oPoA to a new one, say nPoA (new point of attachment). It then performs pre-configuration, with the configuration agent using the configuration protocol to obtain an IP address, say nCoA (new care-of address), and other configuration parameters from the candidate target network, and with the access router using the tunnel management protocol to establish a proactive handover tunnel. In the tunnel management protocol, the mobile node registers oCoA and nCoA as the tunnel outer address and the tunnel inner address, respectively. The signaling messages of the pre-configuration protocol are protected using the MN-CA key and the MN-AR key. When the configuration and the access router are co-located in the same device, the two protocols may be integrated into a single protocol like IKEv2. After completion of the tunnel establishment, the mobile node is able to communicate using both oCoA and nCoA by the end of Step 4.

Step 3 (secure proactive handover main phase): The mobile node determines to switch to the new point of attachment by some means. Before the mobile node switches to the new point of attachment, it starts secure proactive handover by executing binding update of a mobility management protocol and transmitting subsequent data traffic over the tunnel (main phase).

Step 4 (secure proactive handover pre-switching phase): The mobile node completes binding update and becomes ready to switch to the new point of attachment point. The mobile executes the tunnel management protocol to delete the proactive handover tunnel. The mobile node caches nCoA even after deletion of the tunnel. The decision as to when the mobile node is ready to switch to the new point of attachment depends on handover policy.

Step 5 (switching): It is expected that a link-layer handover occurs in this step.

Step 6 (secure proactive handover post-switching phase): The mobile node executes the switching procedure. Upon successful completion of the switching procedure, the mobile node immediately restores the cached nCoA and assigns it to the physical interface attached to the new point of attachment.

After this, direct transmission of data packets using nCoA is possible without using a proactive handover tunnel.

5. Detailed Issues

In order to provide an optimized handover for a mobile experiencing rapid subnet and domain handover, one needs to look into several issues. These issues include discovery of neighboring networking elements, choosing the right network to connect to based on certain policy, changing the layer 2 point of attachment, obtaining an IP address from a DHCP or PPP server, confirming the uniqueness of the IP address, pre-authenticating with the authentication agent such as AAA server in a specific domain, sending the binding update to the correspondent host and obtaining the redirected streaming traffic to the new point of attachment. We describe these issues in details in the following paragraphs and describe how we have optimized these in case of MPA-based secure proactive handover.

5.1 Discovery

Discovery of neighboring networking elements such as access points, access routers, authentication servers help expedite the handover process during a mobile's rapid movement between networks. By discovering the network neighborhood with a desired set of coordinates, capabilities and parameters the mobile can perform many of the operation such as pre-authentication, proactive IP address acquisition, proactive address resolution, and binding update while in the previous network.

There are several ways a mobile can discover the neighboring networks. The Candidate Access Router Discovery protocol [I-D.ietf-seamoby-card-protocol] helps discover the candidate access routers in the neighboring networks. Given a certain network domain SLP and DNS help provide address of the networking components for a given set of services in the specific domain. In some cases many of the network layer and upper layer parameters may be sent over link-layer management frames such as beacons when the mobile approaches the vicinity of the neighboring networks. IEEE 802.11u is considering issues such as discovering neighborhood using information contained in link-layer. However, if the link-layer management frames are encrypted by some link-layer security mechanism, then the mobile node may not able to obtain the requisite information before establishing link-layer connectivity to the access point. In addition this may add burden to the bandwidth constrained wireless medium. In such cases a higher layer protocol is preferred to obtain the information regarding the neighboring elements. There is some proposal such as [NETDISC] that helps obtain these information about the neighboring networks from a mobility server. When the mobile's movement is imminent, it starts the discovery process by querying a specific server and obtains the required parameters such as the IP address of the access point, its characteristics, routers, SIP servers or authentication servers of the neighboring networks. In the event of multiple networks, it may obtain the required parameters from more than one neighboring networks and keep these in cache. At some point the mobile finds out several candidate target networks out of many probable networks and starts the pre-authentication process by communicating with the required entities in the candidate target networks.

5.2 Proactive IP Address Acquisition

In general, a mobility management protocol works in conjunction with Foreign Agent or in co-located address mode. In the preferred embodiments, the present MPA approach can use both co-located address mode and foreign agent address mode. We discuss here the address assignment component that is used in co-located address mode. There are several ways a mobile node can obtain an IP address and configure itself. Most commonly a mobile can configure itself statically in the absence of any configuring element such as a server or router in the network. The IETF Zeroconf working group defines auto-IP mechanism where a mobile is configured in an adhoc manner and picks a unique address from a specified range such as 169.254.x.x. In a LAN environment the mobile can obtain IP address from DHCP servers. In case of IPv6 networks, a mobile has the option of obtaining the IP address using stateless auto-configuration as well. In a wide area networking environment, a mobile uses PPP to obtain the IP address by communicating with a NAS.

Each of these processes takes on the order of a few hundred mili-seconds to few seconds depending upon the type of IP address acquisition process and operating system of the clients and servers. Since IP address acquisition is part of the handover process, it adds to the handover delay and thus it is desirable to reduce this timing as much as possible. There are few optimized techniques such as DHCP Rapid Commit [I-D.ietf-dhc-rapid-commit-opt], GPS-coordinate based IP address [GPSIP] available that attempt to reduce the handover time due to IP address acquisition time. However in all these cases the mobile also obtains the IP address after it moves to the new subnet and incurs some delay because of the signaling handshake between the mobile node and the DHCP server.

In the following paragraphs, a few ways a mobile node can obtain the IP address proactively from the candidate target network and the associated tunnel setup procedure are described. These can broadly be defined into three categories such as PANA-assisted proactive IP address acquisition, IKE-assisted proactive IP address acquisition and proactive IP address acquisition using DHCP only.

5.2.1 PANA-Assisted Proactive IP Address Acquisition

In case of PANA-assisted proactive IP address acquisition, the mobile node obtains an IP address proactively from a candidate target network. The mobile node makes use of PANA messages to trigger the address acquisition process on the DHCP relay agent that co-locates with PANA authentication agent in the access router in the candidate target network. Upon receiving a PANA message from the mobile node, the DHCP relay agent performs normal DHCP message exchanges to obtain the IP address from the DHCP server in the candidate target network. This address is piggy-backed in a PANA message and delivered to the client.

5.2.2 IKEv2-Assisted Proactive IP Address Acquisition

IKEv2-assisted proactive IP address acquisition works when an IPsec gateway and a DHCP relay agent are resident within each access router in the candidate target networks. In this case, the IPsec gateway and DHCP relay agent in a candidate target network help the mobile node acquire the IP address from the DHCP server in the candidate target network. The MN-AR key established during the pre-authentication phase is used as the IKEv2 pre-shared secret needed to run IKEv2 between the mobile node and the access router. The IP address from the candidate target network is obtained as part of standard IKEv2 procedure, with using the co-located DHCP relay agent for obtaining the IP address from the DHCP server in the target network using standard DHCP. The obtained IP address is sent back to the client in the IKEv2 Configuration Payload exchange. In this case, IKEv2 is also used as the tunnel management protocol for a proactive handover tunnel (see Section 5.4).

5.2.3 Proactive IP Address Acquisition Using DHCP Only

As another alternative, DHCP may be used for proactively obtaining an IP address from a candidate target network without relying on PANA or IKEv2-based approaches by allowing direct DHCP communication between the mobile node and the DHCP relay or DHCP server in the candidate network. In this case, the mobile node sends a unicast DHCP message to the DHCP relay agent or DHCP server in the candidate target network requesting an address, with using the address associated with the current physical interface as the source address of the request.

When the message is sent to the DHCP relay agent, the DHCP relay agent relays the DHCP messages back and forth between the mobile node and the DHCP server. In the absence of a DHCP relay agent the mobile can also directly communicate with the DHCP server in the target network. The broadcast option in client's unicast DISCOVER message should be set to 0 so that the relay agent or the DHCP server can send back the reply directly to the mobile using the mobile node's source address.

In order to prevent malicious nodes from obtaining an IP address from the DHCP server, DHCP authentication should be used or the access router should install a filter to block unicast DHCP message sent to the remote DHCP server from mobile nodes that are not pre-authenticated. When DHCP authentication is used, the DHCP authentication key may be derived from the MPA-SA established between the mobile node and the authentication agent in the candidate target network.

The proactively obtained IP address is not assigned to the mobile node's physical interface until the mobile has not moved to the new network. The IP address thus obtained proactively from the target network should not be assigned to the physical interface but rather to a virtual interface of the client. Thus such a proactively acquired IP address via direct DHCP communication between the mobile node and the DHCP relay or the DHCP server in the candidate target network may be carried with additional information that is used to distinguish it from other address assigned to the physical interface.

Upon the mobile's entry to the new network, the mobile node can perform DHCP over the physical interface to the new network to get other configuration parameters such as SIP server, DNS server, etc., by using e.g., DHCP INFORM. This should not affect the ongoing communication between the mobile and correspondent host. Also, the mobile node can perform DHCP over the physical interface to the new network to extend the lease of the address that was proactively obtained before entering the new network.

In order to maintain the DHCP binding for the mobile node and keep track of the dispensed IP address before and after the secure proactive handover, the same DHCP client identifier needs to be used for the mobile node for both DHCP for proactive IP address acquisition and DHCP performed after the mobile node enters the target network. The DHCP client identifier may be the MAC address of the mobile node or some other identifier.

5.3 Address Resolution Issues 5.3.1 Proactive Duplicate Address Detection

When the DHCP server dispenses an IP address, it updates its lease table, so that this same address is not given to another client for that specific period of time. At the same time, the client also keeps a lease table locally so that it can renew when needed. In some cases where a network includes both DHCP and non-DHCP enabled clients, there is a probability that another client with the LAN may have been configured with an IP address from the DHCP address pool. In such scenario the server does a duplicate address detection based on ARP (Address Resolution Protocol) or IPv6 Neighbor Discovery before assigning the IP address. This detection procedure may take up to 4 sec to 15 sec [MAGUIRE] and will thus contribute to a larger handover delay. In case of proactive IP address acquisition process, this detection is performed ahead of time and thus does not affect the handover delay at all. By performing the duplicate address detection ahead of time, we reduce the handover delay factor.

5.3.2 Proactive Address Resolution Update

During the process of pre-configuration, the address resolution mappings needed by the mobile node to communicate with nodes in the target network after attaching to the target network can also be known, where the nodes may be the access router, authentication agent, configuration agent and correspondent node. There are several possible ways of performing such proactive address resolution.

Use an information service mechanism [NETDISC] to resolve the MAC addresses of the nodes. This might require each node in the target network to involve in the information service so that the server of the information service can construct the database of proactive address resolution.

Extend the authentication protocol used for pre-authentication or the configuration protocol used for pre-configuration to support proactive address resolution. For example, if PANA is used as the authentication protocol for pre-authentication, PANA messages may carry AVPs used for proactive address resolution. In this case, the PANA authentication agent in the target network may perform address resolution for on behalf of the mobile node.

Define a new DNS resource recode to proactively resolve the MAC addresses of the nodes in the target network. This is less desirable because the mapping between domain name and MAC address is not stable in general.

When the mobile node attaches to the target network, it installs the proactively obtained address resolution mappings without necessarily performing address resolution query for the nodes in the target network.

On the other hand, the nodes that reside in the target network and are communicating with the mobile node should also update their address resolution mappings for the mobile node as soon as the mobile node attaches to the target network. The above proactive address resolution methods could also be used for those nodes to proactively resolve the MAC address of the mobile node before the mobile node attaches to the target network. However, this is not as desirable since those nodes need to detect the attachment of the mobile node to the target network before adopting the proactively resolved address resolution mapping. A better approach would be integration of attachment detection and address resolution mapping update. This is based on gratuitously performing address resolution [RFC3344], [RFC3775] in which the mobile node sends an ARP Request or an ARP Reply in the case of IPv4 or a Neighbor Advertisement in the case of IPv6 immediately after the mobile node attaches to the new network so that the nodes in the target network can quickly update the address resolution mapping for the mobile node.

5.4 Tunnel Management

After an IP address is proactively acquired from the DHCP server in a candidate target network, a proactive handover tunnel is established between the mobile node and the access router in the candidate target network. The mobile node uses the acquired IP address as the tunnel inner address and most likely it assigns the address to a virtual interface.

The proactive handover tunnel is established using a tunnel management protocol. When IKEv2 is used for proactive IP address acquisition, IKEv2 is also used as the tunnel management protocol. Alternatively, when PANA is used for proactive IP address acquisition, PANA may be used as the secure tunnel management protocol.

Once the proactive handover tunnel is established between the mobile node and the access router in the candidate target network, the access router also needs to perform proxy address resolution on behalf of the mobile node so that it can capture any packets destined to the mobile node's new address.

Since mobile needs to be able to communicate with the correspondent node while in the previous network some or all part of binding update and data from the correspondent node to mobile node need to be sent back to the mobile node over a proactive handover tunnel. When SIP Mobility is used for the mobility management protocol, the new address as the contact address is reported to the correspondent node using SIP Re-INVITE. Once the correspondent node's SIP user agent obtains the new contact address it sends the OK to the new contact address which actually belongs to the target network. The access router in the target network picks up the OK signal as it was directed to the new contact address and tunnels it to the mobile in its previous network. Final ACK message is received from the mobile to the correspondent node. Data from the mobile to the correspondent node may not need to be tunneled in the absence of ingress filtering. After completion of the SIP Re-INVITE signaling handshake, the data from the correspondent node is sent to mobile via the proactive handover tunnel.

In order for the traffic to be directed to the mobile node after the mobile node attaches to the target network, the proactive handover tunnel needs to be deleted or disabled. The tunnel management protocol used for establishing the tunnel is used for this purpose. Alternatively, when PANA is used as the authentication protocol the tunnel deletion or disabling at the access router can be triggered by means of PANA update mechanism as soon as the mobile moves to the target network. A link-layer trigger ensures that the mobile node is indeed connected to the target network and can also be used as the trigger to delete or disable the tunnel.

5.5 Binding Update

There are several kinds of binding update mechanisms for different mobility management schemes. In some cases such as Mobile IPv4 without RO binding update is sent to home agent only, binding update is sent both to the home agent and corresponding host in case of Mobile IPv6. In case of SIP-based terminal mobility the mobile sends binding update using ReINVITE both to the registrar and correspondent host as well. Based on the distance between the mobile and the correspondent node the binding update may contribute to the handover delay. SIP-fast handover [SIPFAST] provides several ways of reducing the handover delay due to binding update. In case of secure proactive handover using SIP-based mobility management we rule out the delay due to binding update completely, as it takes place in the previous network. Thus, this scheme looks more attractive when the correspondent node is too far from the communicating mobile node.

5.6 Preventing Packet Loss

In an illustrative MPA case, we did not observe any packet loss due to IP address acquisition, secured authentication and binding update. However, there may be some transient packets during link-layer handover and until the traffic to be directed to the mobile node after attaching to the target network. Those transient packets can be lost. Bicasting or buffering the transient packets at the access router can be used to minimize or eliminate packet loss. However, bicasting does not eliminate packet loss if link-layer handover is not seamlessly performed. On the other hand, buffering does not reduce packet delay. While packet delay can be compensated by playout buffer at the receiver side for streaming application, playout buffer does not help much for interactive VoIP application which is not tolerate for large delay jitters. Thus, it is still important to optimize the link-layer handover anyway.

5.7 Link-Layer Security and Mobility

Using the MPA-SA established between the mobile node and the authentication agent in a candidate target network, during the pre-authentication phase, it is possible to bootstrap link-layer security in the candidate target network while the mobile node is in the current network in the following way. While link-layer security is described in detail, some embodiments can similarly provide bootstrapping of IP-layer and/or higher layer security in the candidate target network while the mobile node is in the current network.

(1) The authentication agent in the candidate target network and the mobile node derives a PMK (Pair-wise Master Key) [I-D.ietf-eap-keying] using the MPA-SA that is established as a result of successful pre-authentication. Executions of EAP and a AAA protocol may be involved during pre-authentication to establish the MPA-SA. From the PMK, distinct TSKs (Transient Session Keys) [I-D.ietf-eap-keying] for the mobile node are directly or indirectly derived for each point of attachment of the candidate target network.

(2) The authentication agent may install the keys derived from the PMK and used for secure association to points of attachment. The derived keys may be TSKs or intermediary keys from which TSKs are derived.

(3) After the mobile node chooses the candidate target network as the target network and switches to a point of attachment in the target network (which now becomes the new network for the mobile node), it executes a secure association protocol such as IEEE 802.11i 4-way handshake [802.11i] using the PMK in order to establish PTKs (Pair-wise Transient Keys) and GTKs (Group Transient Keys) [I-D.ietf-eap-keying] used for protecting link-layer packets between the mobile node and the point of attachment. No additional execution of EAP authentication is needed here.

(4) While the mobile node is roaming in the new network, the mobile node only needs to perform a secure association protocol with its point of attachment point and no additional execution of EAP authentication is needed either. Integration of MPA with link-layer handover optimization mechanisms such as 802.11r can be archived this way.

The mobile node may need to know the link-layer identities of the point of attachments in the candidate target network to derive TSKs. If PANA is used as the authentication protocol for pre-authentication, this is possible by carrying Device-Id AVPs in the PANA-Bind-Request message sent from the PAA [I-D.ietf-pana-pana], with each AVP containing the BSSID of a distinct access point.

5.8 Authentication in Initial Network Attachment

When the mobile node initially attaches to a network, network access authentication would occur regardless of the use of MPA. The protocol used for network access authentication when MPA is used for handover optimization can be a link-layer network access authentication protocol such as IEEE 802.1X or a higher-layer network access authentication protocol such as PANA.

6. Initial Implementation and Results

We describe a specific scenario where we evaluate both MPA and non-MPA based approaches. This section describes details of one of the specific implementation for MPA and non-MPA. In addition to implementation details, this section also provides the evaluation results of optimized hand-off with MPA and compares it with non-MPA-based handover.

6.1 Network Structure

The experiment network structure is shown in FIG. 4.

There are three networks defined in the implementation environment. Network 1 is old point of attachment (oPoA), Network 2 is new point of attachment (nPoA), and network 3 is where the correspondent node (CN) resides. The mobile is initially in Network 1 and starts communicating with the correspondent node. Network 1, network 2, and network 3 do not need to be adjacent. In the illustrative implementation scenario, however, network 1, network 2 and network 3 are one hop away. In the event of mobile's movement, a specific Mobility Management Protocol (MMP) can take care of continuity of streaming traffic set up by the peer-to-peer application.

Network 1 includes DHCP Server 1, access point (AP) 1 and Access Router 1. Network 2 includes DHCP Server 2, AP 2 and Access Router 2. AP 1 and AP 2 are 802.11 wireless LAN access points. Router 2 also works as a PANA Authentication Agent (PAA) [I-D.ietf-pana-pana] and a DHCP Relay Agent [RFC3046] for Network 2, but they can be separated. DHCP relay-agent also acts like a Configuration Agent (CA) that helps obtain the IP address for the mobile proactively from the neighboring target network. Network 3 includes a Correspondent Node (CN) that communicates with the mobile node in Network 1. Both the correspondent node and mobile node are equipped with mobility enabled SIP client. Mobile SIP client is also equipped with PANA Client (PaC). In this specific case SIP proxies are not involved to set up the initial communication between the correspondent node and mobile node. Mobile Node (MN) uses 802.11 wireless LAN as the access method and can communicate via AP 1 before it moves to Network 2 where it communicates via AP 2. In this specific case, the Mobility Management Protocol (MMP) is SIP Mobility (SIP-M), configuration protocol is DHCP, authentication agent (AA) is PAA, configuration agent (CA) is DHCP Relay Agent and Access Router (AR) is Router 2 that can provide IP-in-IP tunneling [RFC1853] management functions. The MN is also equipped with IP-in-IP tunneling management function. Thus the mobile has the ability to set up a tunnel interface and detunnel the packets sent over the tunnel between the router 2 and the mobile. In this specific case, we have used IPv4, although one can as well use mobility management for IPv6 such as MIPv6 or SIP mobility over IPv6.

6.2 MPA Scenario

The communication flow for MPA in our implementation environment is described below and in FIG. 5

Step 0: As the MN bootstraps it associates with AP 1 and obtains the IP address old Care of Address (oCoA) from the DHCP Server 1 in network 1. The MN's SIP user agent communicates with CN's SIP user agent. After a successful connection setup between the mobile and correspondent node, a voice traffic flows between the MN and the CN. This voice traffic is carried over RTP/UDP. We have used RAT (Robust Audio Tool) as the media agent.

In Step 1 (pre-authentication phase), there are some triggers to Step 1 such as AP 1's link level going down because of MN's movement. MN prepares to start the handover process and obtains the information about the required elements of the target network from an information server. Then the MN performs pre-authentication with PAA and derives the MN-CA key and MN-AR key from the MPA-SA if the pre-authentication is successful.

In Step 2 (pre-configuration phase), the MN performs pre-configuration by communicating with DHCP Proxy to obtain IP address and so forth. DHCP proxy and Authentication Agent (AA) are co-located in this case. This IP address is the new Care of Address (nCoA) the mobile would have obtained after moving to the new network. DHCP Proxy gets the IP address from DHCP Server 2. The new IP address of the mobile is relayed back to the mobile as part of its pre-authentication process. After the MN gets the new IP address (nCoA), an IP-in-IP tunnel is created between Router 2 and the mobile.

At this point the behavior of the MN and Router 2 is basically followed by [RFC1853] and the signals are cryptographically protected by using the MN-CA key.

In Step 3 (secure proactive handover main phase), once the mobile is configured with the new IP address (nCoA) on its virtual interface and a tunnel is set up between the mobile and R2, the MN sends SIP Re-invite with nCoA as its contact address to the CN. All the SIP Re-invite signaling are carried over the tunnel and so as the new RTP stream. Thus, the mobile receives the traffic in the old network even if the CN sends traffic to nCoA.

Step 4 (secure proactive handover pre-switching phase): As the mobile detects the new point of attachment and makes a decision to switch over to the new network it associates with AP 2. At this point the mobile configures itself by assigning the nCoA to its physical interface and updates the default router from the local cache that is stored during the pre-configuration phase in network 1. The MN sends a PANA-Update-Request message to the access router R2. This update message deletes the tunnel on the router R2 and deletes the tunnel locally on the mobile. Mobile's ARP entry with nCoA is also updated in the router R2 during the secure proactive handover thus reducing the delay due to ARP process that usually happens when a new node comes to a network.

6.3 Non-MPA Scenario

For the comparison purposes, non-MPA scenario is also experimented and is described here. Non-MPA scenario does not provide any proactive handover mechanism as such but follows standard handover procedure.

Following are the steps of non-MPA scenario in a likely similar situation. There is no proactive handover involved in this case. Steps involved as part of initial communication setup while the mobile is in network 1 remain same as that of MPA part. Based on some policy decision such as signal-to-noise ratio, the mobile decides to switch to the new network.

In first step, the MN associates with AP 2 and obtains new IP address from DHCP Server 2, then assigns the IP address to the network interface.

In second step, the MN authenticates to the PAA. No data can flow through router R2, until the mobile successfully authenticates to the PAA. This adds the delay for post-authentication.

In third step, the MN sends SIP Re-invite with the new IP address obtained from the DHCP server in the new network, then the voice traffic is destined to the new IP address. This binding update can taken potentially a lot of time if the mobile's target network and the correspondent node are far apart.

6.4 The Evaluation and the Results

In case of MPA scenario, there is no packet loss during pre-authentication, and secure proactive handover before link-layer handover takes place when the mobile moves to the new network. Delay and associated packet loss are observed due to link-layer handover delay and tunnel deletion mechanism during the handover. This handover delay is limited to 280 ms including the link-layer delay. This amounts to total 14 packets being lost because of these processes. Optimizing link-layer delay using a scheme such as [MACD] reduces the total packets lost to about 4 packets. It is important to note that the scheme described in [MACD] has been experimented with HOSTAP driver only.

In case of non-MPA scenario, handover delay and attributed packet loss take place because of L2 handover during the movement, IP address assignment, post-authentication, and mobility binding update. Especially DHCP takes long time to complete the detection of duplicate of IP address in the network and binding update can take a long time if the correspondent node is too far from the mobile node. In our testbed non-MPA-based handover took up to 4 seconds delay due to all the above factors. Based on type of streaming traffic that was sent once in every 20 ms using RAT approximately 200 packets were lost.

6.5 Further Notations

In this example network, a portion of function is omitted such as pre-authorization process, but it can be implemented to the network and it's not critical section for the handover.

In this example network, candidate protocols can always be replaced by the other protocols, for example, a mobility management protocol can be replaced by Mobile IPv4 or Mobile IPv6. In such a case a Home Agent could be in Network 3, similarly the tunnel management protocol can be replaced by IKEv2 and IPsec tunnel mode. The performance values may be different based on the type of candidate protocols used. It was found that L2 delay can vary based on the drivers and operating system used.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example;" and "NB" which means "note well."

What is claimed is:

1. A method for performing media-independent pre-authentication (MPA) of a mobile node that is connected to a current network for handover of the mobile node to a candidate target network that the mobile node is not connected to, the method comprising:
    employing a mobility optimization scheme configured to work over a link-layer that supports internet protocol (IP) traffic at layer 3 and with a network layer or application layer mobility management protocol;
    providing a mobile node that has established connectivity to a first-media network;
    via the first-media network performing pre-authentication of the mobile node at higher layers and proactively establishing higher layer and lower layer contexts of a different-media candidate target network to which the mobile node can move using an authentication agent in the candidate target network, including executing an authentication protocol between the mobile node and said authentication agent to derive a key between the mobile node and said authentication agent; and
    executing a configuration protocol using a configuration agent in the candidate target network to obtain an IP address or new care-of address for a proactive handover of the mobile node to the candidate target network;
    wherein the mobile node completes higher layer handover to the candidate target network before starting link-layer handover to the candidate target network.

2. The method of claim 1, wherein said first-media is cellular and said different-media is wireless LAN or wherein said first-media is wireless LAN and said different-media is cellular.

3. The method of claim 1, further including having the mobile node securely obtain an IP address and other configuration parameters from the candidate target network and also send and receive IP packages using an obtained IP address and obtained configuration parameters before it attaches to the candidate target network.

4. The method of claim 1, further including having the mobile node that has established connectivity to the first-media network but that is not yet attached to the candidate target network (i) establish a security association with the candidate target network to secure the subsequent protocol executions, and then (ii) securely execute a configuration protocol to obtain an IP address and other configuration parameters from the candidate target network as well as a tunnel management protocol to establish a bidirectional tunnel between the mobile node and an access router of the candidate target network, and then (iii) send and receive IP packets, including signaling messages for binding update of a mobility management protocol and data packets transmitted after completion of binding update, over the tunnel using the obtained IP address as a tunnel inner address.

5. The method of claim 1, further including providing the following functional elements within the candidate target network: the authentication agent; a configuration agent; and an access device, each located in either a single network device or in separate network devices.

6. A method for performing media-independent pre-authentication (MPA) of a mobile node that is connected to a current network for handover of the mobile node to a candidate target network that the mobile node is not connected to, the method comprising:
    a) performing a pre-authentication phase in which a mobile node finds a candidate target network through an application layer discovery process and obtains an IP address and discovers each of an authentication agent, a configuration agent and an access device each located in the candidate target network, with the mobile node performing pre-authentication with the authentication agent in the candidate target network, including executing an authentication protocol between the mobile node and said authentication agent to derive a key between the mobile node and said authentication agent;

b) performing a pre-configuration phase to obtain an IP address or new care-of address and other configuration parameters from the candidate target network by executing a configuration protocol with the configuration agent in the candidate target network, with the access device using a tunnel management protocol to establish a proactive handover tunnel between the mobile node and the access device in the candidate target network;

c) further including performing an address resolution procedure for the mobile node before handover to the candidate target network.

7. The method of claim 6, wherein said address resolution procedure is performed by a device in the candidate target network.

8. The method of claim 7, wherein said address resolution procedure is performed by an access router in the candidate target network.

9. The method of claim 6, wherein said address resolution procedure includes performing duplicate address detection.

10. The method of claim 9, wherein said duplicate address detection is performed based on address resolution protocol or IPv6 Neighbor Discovery before assigning an IP address to the mobile node.

11. The method of claim 6, wherein said address resolution procedure includes performing proactive address resolution.

12. The method of claim 11, wherein said proactive address resolution includes that during the process of pre-configuration, address resolution mappings needed by the mobile node to communicate in the candidate target network with an access device, an authentication agent, and a configuration agent are proactively established by associating between IP addresses and MAC addresses.

13. The method of claim 12, wherein nodes in the candidate target network that communicate with the mobile node update resolution mappings for the mobile node once the mobile node attaches to the candidate target network, wherein said mobile node communicates with an access router in the candidate target network upon attachment to the candidate target network and updates an address resolution on said access router.

14. The method of claim 13, further including performing an integration of attachment detection of the mobile node and address resolution mapping update.

15. A method for performing media-independent pre-authentication (MPA) of a mobile node that is connected to a current network for handover of the mobile node to a candidate target network that the mobile node is not connected to, the method comprising:

a) performing a pre-authentication phase in which a mobile node finds a candidate target network through an application layer discovery process and obtains an IP address and discovers each of an authentication agent, a configuration agent and an access device each located in the candidate target network, with the mobile node performing pre-authentication with the authentication agent in the candidate target network, including executing an authentication protocol between the mobile node and said authentication agent to derive a key between the mobile node and said authentication agent;

b) performing a pre-configuration phase to obtain an IP address or new care-of address and other configuration parameters from the candidate target network by executing a configuration protocol with the configuration agent in the candidate target network, with the access device using a tunnel management protocol to establish a proactive handover tunnel between the mobile node and the access device in the candidate target network; and c) multicasting, bicasting or buffering transient packets to minimize or eliminate packet loss.

16. The method of claim 15, further including an access router buffering packets going to the mobile node at the access router.

17. The method of claim 15, further including an access router casting packets to multiple access networks at the access router.

18. A method for performing media-independent pre-authentication (MPA) of a mobile node that is connected to a current network for handover of the mobile node to a candidate target network that the mobile node is not connected to, the method comprising:

a) performing a pre-authentication phase in which a mobile node finds a candidate target network through an application layer discovery process and obtains an IP address and discovers each of an authentication agent, a configuration agent and an access device each located in the candidate target network, with the mobile node performing pre-authentication with the authentication agent in the candidate target network, including executing an authentication protocol between the mobile node and said authentication agent to derive a key between the mobile node and said authentication agent;

b) performing a pre-configuration phase to obtain an IP address or new care-of address and other configuration parameters from the candidate target network by executing a configuration protocol with the configuration agent in the candidate target network, with the access device using a tunnel management protocol to establish a proactive handover tunnel between the mobile node and the access device in the candidate target network; and c) using a media-independent pre-authentication-security association (MPA-SA) established between the mobile node and the authentication agent in a candidate target network during the pre-authentication or pre-configuration phases, bootstrapping link-layer, IP layer or higher layer security in the candidate target network while the mobile node is in the current network.

19. The method of claim 18, wherein the authentication agent in the candidate target network and the mobile node derive a key using said MPA-SA.

20. A method for performing initial network attachment in a system employing media-independent pre-authentication (MPA) of a mobile node that is connected to a current network for handover of the mobile node to a candidate target network that the mobile node is not connected to, the method comprising:

a) providing a system configured to perform a pre-authentication phase in which a mobile node finds a candidate target network through an application layer discovery process and obtains an IP address and discovers each of an authentication agent, a configuration agent and an access device in the candidate target network, with the mobile node performing pre-authentication with the authentication agent in the candidate target network, including executing an authentication protocol between the mobile node and said authentication agent to derive a key between the mobile node and said authentication agent, and configured to perform a pre-configuration phase to obtain an IP address or new care-of address and other configuration parameters from the candidate target network by executing a configuration protocol with the configuration agent in the candidate target network, with the access device using a tunnel management protocol to establish a proactive handover tunnel between the mobile node and the access device in the candidate target network; and b) including when the mobile node initially attaches to a network, performing authentication in the initial network attachment using a link-layer network access authentication protocol or a higher-layer network access authentication protocol.

21. The method of claim 20, including using I.E.E.E. 802.X link-layer network access authentication protocol.

22. The method of claim 20, including using PANA network-layer network access authentication protocol.

23. A method for performing media-independent pre-authentication (MPA) of a mobile node that is connected to a current network for handover of the mobile node to a candidate target network that the mobile node is not connected to, the method comprising:

a) performing a pre-authentication phase in which a mobile node finds a candidate target network through an application layer discovery process and obtains an IP address and discovers each of an authentication agent, a configuration agent and an access device in the candidate target network, with the mobile node performing pre-authentication with the authentication agent in the candidate target network, including executing an authentication protocol between the mobile node and said authentication agent to derive a key between the mobile node and said authentication agent;

b) performing a pre-configuration phase to obtain an IP address or new care-of address and other configuration parameters from the candidate target network by executing a configuration protocol with the configuration agent in the candidate target network, with the access device using a tunnel management protocol to establish a proactive handover tunnel between the mobile node and the access device in the candidate target network; and c) performing proactive IP address acquisition using DHCP in which the mobile node directly communicates to the DHCP server in the candidate target network or to a DHCP relay agent in the candidate target network.

24. The method of claim 23, further including providing a DHCP relay agent in the candidate target network that relays the DHCP messages between the mobile node and a DHCP server.

25. The method of claim 23, further including providing a filter that blocks DHCP messages sent from mobile nodes that are not pre-authenticated.

26. The method of claim 7, wherein said performing an address resolution procedure includes associating IP addresses with MAC addresses.

27. The method of claim 26, wherein said address resolution procedure further includes an access router in the candidate target network keeping a mapping between a new care-of-address, used as an IP address by a mobility management protocol as a locator of the mobile node, and a MAC address proactively, even before the mobile node moves to the candidate target network.

28. The method of claim 18, further including using an MPA security association established between the mobile node and the authentication agent in the candidate target network, bootstrapping link-layer security in the candidate target network as part of the security process while the mobile node is within the current network.

29. The method of claim 23, further including performing a combination of broadcast and unicast messaging to obtain the IP address from the candidate access network for the mobile node.

30. The method of claim 25, wherein said filter includes providing said mobile node with a configuration agent key after authentication is successful to securely obtain an IP address.

\* \* \* \* \*

UNITED STATES PATENT AND TRADEMARK OFFICE
CERTIFICATE OF CORRECTION

| | | |
|---|---|---|
| PATENT NO. | : 7,813,319 B2 | Page 1 of 1 |
| APPLICATION NO. | : 11/307362 | |
| DATED | : October 12, 2010 | |
| INVENTOR(S) | : Dutta et al. | |

It is certified that error appears in the above-identified patent and that said Letters Patent is hereby corrected as shown below:

On the Title Page

In item (73), under "Assignees", in Column 1, Lines 1-3, delete "Toshiba America Research, Inc., Piscataway; Telcordia Technologies, Inc., Piscataway" and insert -- Toshiba America Research, Inc., Piscataway, NJ (US); Telcordia Technologies, Inc., Piscataway, NJ (US) --, therefor.

On Page 2, in item (56), under "OTHER PUBLICATIONS", in Column 1, Line 43, delete "Managem" and insert -- Management --, therefor.

On Page 2, in item (56), under "OTHER PUBLICATIONS", in Column 2, Line 41, delete "Tunnling" and insert -- Tunneling --, therefor.

In the Drawings

In Fig. 2, Sheet 2 of 4, delete "Scure proactive handover pre-switching" and insert -- Secure proactive handover pre-switching --, therefor.

In the Specification

In Column 4, Line 60, delete "[1-D." and insert -- [I-D. --, therefor.

In Column 4, Line 63, delete "Cirsuits:" and insert -- Circuits: --, therefor.

In Column 4, Line 64, delete "hearin" and insert -- herein --, therefor.

In Column 15, Line 44, delete "constrainted" and insert -- constrained --, therefor.

Signed and Sealed this
Ninth Day of December, 2014

Michelle K. Lee
*Deputy Director of the United States Patent and Trademark Office*